(12) United States Patent
Takehana et al.

(10) Patent No.: US 12,263,629 B2
(45) Date of Patent: Apr. 1, 2025

(54) MOLD AND DEVICE FOR MANUFACTURING RESIN CONTAINER

(71) Applicant: NISSEI ASB MACHINE CO., LTD., Nagano (JP)

(72) Inventors: Daizaburo Takehana, Nagano (JP); Yukihiro Ichihashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 85 days.

(21) Appl. No.: 18/266,919

(22) PCT Filed: Dec. 15, 2021

(86) PCT No.: PCT/JP2021/046352
§ 371 (c)(1),
(2) Date: Jun. 13, 2023

(87) PCT Pub. No.: WO2022/131307
PCT Pub. Date: Jun. 23, 2022

(65) Prior Publication Data
US 2024/0051213 A1    Feb. 15, 2024

(30) Foreign Application Priority Data
Dec. 15, 2020   (JP) ................. 2020-207555

(51) Int. Cl.
*B29C 49/06*       (2006.01)
*B29B 13/02*       (2006.01)
(Continued)

(52) U.S. Cl.
CPC .......... *B29C 49/4823* (2013.01); *B29B 13/02* (2013.01); *B29C 49/06* (2013.01); *B29C 2049/4838* (2013.01); *B29L 2031/712* (2013.01)

(58) Field of Classification Search
CPC ..... B29C 49/48; B29C 49/06; B29C 49/4823; B29C 2049/4838; B29C 45/1761; B29C 2049/4848; B29B 13/02; B29L 2031/712
See application file for complete search history.

(56) References Cited

U.S. PATENT DOCUMENTS 5,496,166 A * 3/1996 Vogel ............. B29C 49/42
                                                    425/168
11,135,759 B2 * 10/2021 Maruyama ........ B29C 49/6445
(Continued)

FOREIGN PATENT DOCUMENTS

JP     6-344427 A      12/1994
JP     H06344427    *  12/1994 ............ B29C 49/08
(Continued)

OTHER PUBLICATIONS

JPH06344427 English translation prepared on Nov. 20, 2024 (Year: 2024).*
(Continued)

*Primary Examiner* — Christopher M Rodd
*Assistant Examiner* — Shibin Liang
(74) *Attorney, Agent, or Firm* — GREENBLUM & BERNSTEIN, P.L.C.

(57) ABSTRACT

A mold includes a position adjustment mechanism that receives a shaft portion extending from a cavity mold, which accommodates a preform, and adjusts a position where the cavity mold is held on a plane intersecting an extending direction of the shaft portion. The position adjustment mechanism includes a first member in which a linear cam hole that receives the shaft portion is formed, and a second member that is disposed to overlap the first member in the extending direction of the shaft portion and rotates with respect to the first member along a plane. The second member has an elongated hole that intersects the cam hole in a direction of the plane and positions the shaft portion (Continued)

together with the cam hole. Further, a position where the cam hole and the elongated hole intersect each other moves along a longitudinal direction of the cam hole by rotation of the second member.

6 Claims, 10 Drawing Sheets

(51) Int. Cl.
*B29C 49/48* (2006.01)
*B29L 31/00* (2006.01)

(56) References Cited

U.S. PATENT DOCUMENTS

| | | | |
|---|---|---|---|
| 11,478,974 | B2 | 10/2022 | Hidaka et al. |
| 2002/0101010 | A1 | 8/2002 | Vailliencourt |
| 2009/0051065 | A1 | 2/2009 | Niewels |
| 2019/0337218 | A1 | 11/2019 | Kawamura et al. |
| 2022/0176608 | A1 | 6/2022 | Ozaki et al. |

FOREIGN PATENT DOCUMENTS

| | | |
|---|---|---|
| JP | 3330677 B2 | 9/2002 |
| WO | 2020/066749 A1 | 4/2020 |
| WO | 2020/204040 A1 | 10/2020 |

OTHER PUBLICATIONS

Supplementary European Search Report dated Aug. 21, 2024 in European family member application No. 21906668.5.
International Search Report issued Jan. 25, 2022 in International Bureau of WIPO Patent Application No. PCT/JP2021/046352, with an English translation thereof.
Written Opinion issued Jan. 25, 2022 in International Bureau of WIPO Patent Application No. PCT/JP2021/046352, with an English translation thereof.

* cited by examiner

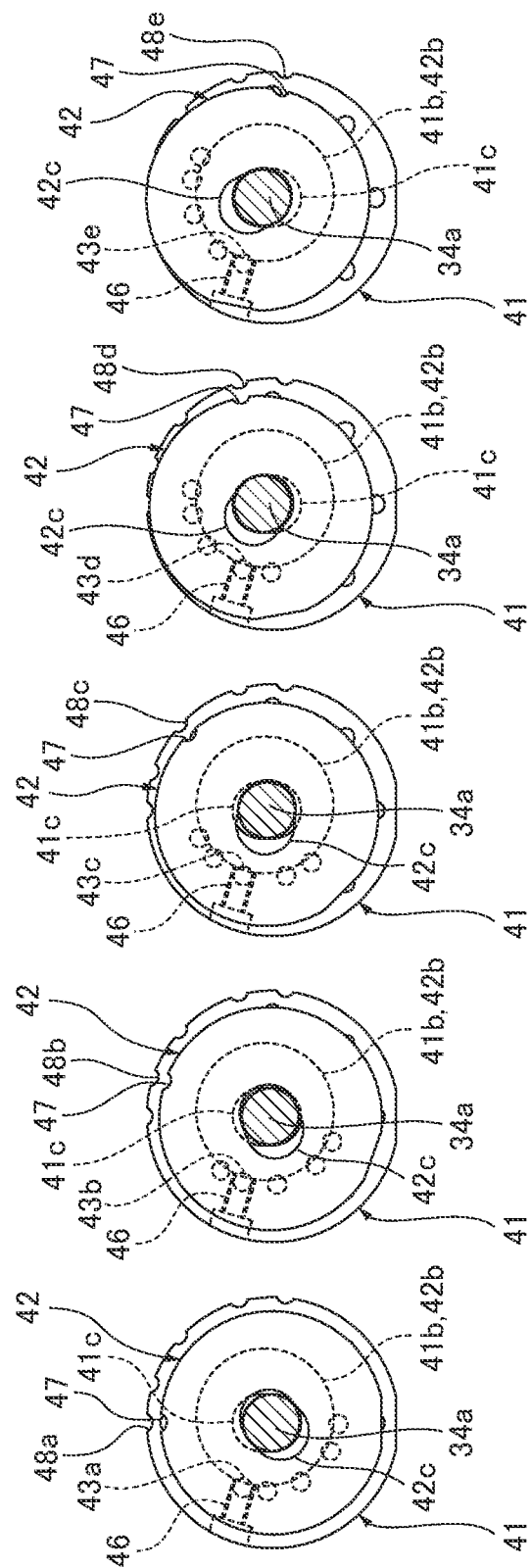

MOLD AND DEVICE FOR MANUFACTURING RESIN CONTAINER

BACKGROUND OF THE INVENTION

Field of the Invention

The present invention relates to a mold and an apparatus for manufacturing a resin container.

Description of the Related Art

Conventionally, a hot parison blow molding method has been known as one of methods for manufacturing a resin container. The hot parison blow molding method is a method of blow-molding a resin container using residual heat from injection molding of a preform, and is advantageous in that more diverse resin containers with more excellent aesthetic appearances can be manufactured as compared with a preform method.

The preform after injection molding has uneven temperature (temperature unevenness) in the circumferential direction due to, for example, misalignment of an injection molding mold. For the purpose of eliminating such a type of temperature unevenness and imparting a temperature distribution suitable for shaping a container, it is proposed to accommodate a preform after injection molding in a temperature adjustment mold and perform temperature adjustment before blow molding (for example, Japanese Patent No. 3330677.

In order to appropriately perform the above-described temperature adjustment of the preform, it is necessary to adjust a position of the temperature adjustment mold such that a surface of the preform and an inner surface of the temperature adjustment mold face each other at an appropriate distance. This adjustment work is frequently performed in molding adjustment and the like, but is extremely complicated for a worker.

SUMMARY OF THE INVENTION

One aspect of the present invention is a mold including a position adjustment mechanism that receives a shaft portion extending from a cavity mold, which accommodates a preform, and adjusts a position where the cavity mold is held on a plane intersecting an extending direction of the shaft portion. The position adjustment mechanism includes a first member in which a linear cam hole that receives the shaft portion is formed, and a second member that is disposed to overlap the first member in the extending direction of the shaft portion and rotates with respect to the first member along a plane. The second member has an elongated hole that intersects the cam hole in a direction of the plane and positions the shaft portion together with the cam hole. Further, a position where the cam hole and the elongated hole intersect each other moves along a longitudinal direction of the cam hole by rotation of the second member.

Further features of the present invention will become apparent from the following description of exemplary embodiments with reference to the attached drawings.

BRIEF DESCRIPTION OF THE DRAWINGS

FIGS. 9A to 9E are views illustrating a rotation state of the movable plate and the fixed plate in the second embodiment.

DESCRIPTION OF THE EMBODIMENTS

Figure 1:
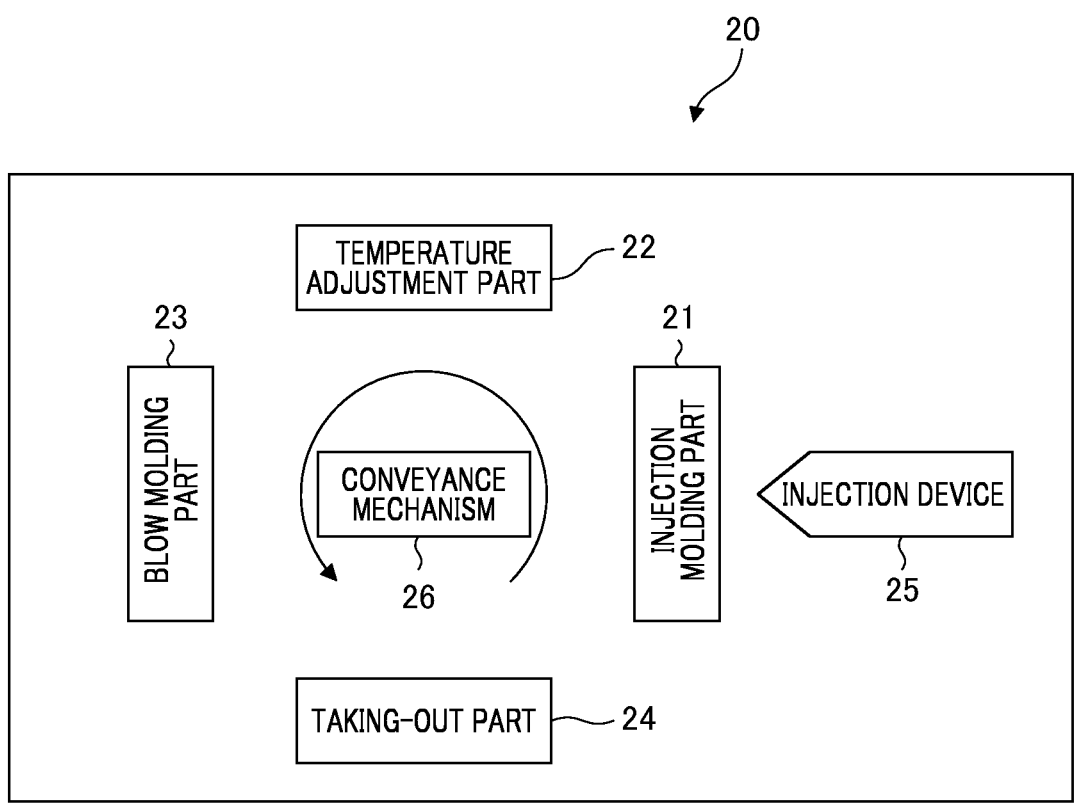
FIG. 1 is a diagram schematically illustrating a configuration of a blow molding apparatus of a first embodiment.

Hereinafter, embodiments of the present invention will be described with reference to the drawings.

In the embodiments, structures and elements other than the main part of the present invention will be described in a simplified or omitted manner in order for easy understanding. Further, the same elements are denoted by the same reference signs in the drawings. Note that shapes, dimensions, and the like of the respective elements illustrated in the drawings are schematically illustrated, and do not indicate actual shapes, dimensions, and the like.

First Embodiment

<Description of Blow Molding Apparatus>

First, a blow molding apparatus 20 configured to manufacture a resin container (hereinafter, simply referred to as a container) will be described with reference to FIG. 1. FIG. 1 is a block diagram schematically illustrating a configuration of the blow molding apparatus 20. The blow molding apparatus 20 according to a first embodiment is an apparatus adopting a hot parison method (also referred to as a one stage method) that performs blow molding by utilizing residual heat (internal heat quantity) from injection molding without cooling a preform 10 to room temperature.

The blow molding apparatus 20 includes an injection molding part 21, a temperature adjustment part 22, a blow molding part 23, a taking-out part 24, and a conveyance mechanism 26. The injection molding part 21, the temperature adjustment part 22, the blow molding part 23, and the taking-out part 24 are disposed at positions rotated each by a predetermined angle (for example, 90 degrees) around the conveyance mechanism 26. The blow molding apparatus 20 includes at least one row of neck molds 27 to be described later. Further, in a case where the blow molding apparatus 20 includes a plurality of rows (for example, two rows or three rows) of neck molds, molds of the respective parts (cavity molds 31 of the temperature adjustment part 22 to be described later) are also configured in the same number of rows.

(Conveyance Mechanism 26)

The conveyance mechanism 26 includes a transfer plate (not illustrated) that moves so as to rotate about an axis in a direction perpendicular to the paper surface of FIG. 1. In the transfer plate, one or more neck molds 27 (not illustrated in FIG. 1) for holding a neck portion of the preform 10 or the container are disposed at each predetermined angle. The conveyance mechanism 26 moves the transfer plate by 90 degrees to convey the preform 10 (or the container) whose neck portion is held by the neck mold 27 to the injection molding part 21, the temperature adjustment part 22, the blow molding part 23, and the taking-out part 24 in this order. Note that the conveyance mechanism 26 further includes a lifting and lowering mechanism (vertical mold opening/closing mechanism) and a mold opening mechanism of the neck mold 27, and also performs an operation of lifting and lowering the transfer plate and an operation related to mold closing and mold opening (releasing) in the injection molding part 21 and the like. Note that the transfer plate may be one disk-shaped member that holds all the neck molds of the respective molding stations, or may have a configuration in which fan-shaped members holding the neck molds are gathered for each molding station.

(Injection Molding Part 21)

The injection molding part 21 includes an injection cavity mold and an injection core mold (not illustrated), and manufactures the preform 10. An injection device 25 that supplies a resin material, which is a raw material of the preform 10, is connected to the injection molding part 21.

In the injection molding part 21, the above-described injection cavity mold and injection core mold, and the neck mold 27 of the conveyance mechanism 26 are closed to form a mold space having a preform shape. Then, the resin material is caused to flow from the injection device 25 into the mold space having such a preform shape, whereby the preform 10 is manufactured by the injection molding part 21.

Here, the entire shape of the preform 10 is a bottomed cylindrical shape that is opened on one end side and closed in a bottom portion 14 on the other end side. A neck portion 12 is formed at an end portion of the preform 10 on the opening side.

Further, a material of the container and the preform 10 is a thermoplastic synthetic resin, and can be appropriately selected according to the use of the container. Specific types of materials include, for example, polyethylene terephthalate (PET), polyethylene naphthalate (PEN), polycyclohexanedimethylene terephthalate (PCTA), and Tritan (registered trademark), which is a copolyester manufactured by Eastman Chemical Company), polypropylene (PP), polyethylene (PE), polycarbonate (PC), polyether sulfone (PES), polyphenyl sulfone (PPSU), polystyrene (PS), a cyclic olefin polymer (COP/COC), polymethyl methacrylate (PMMA), which is acrylic, polylactic acid (PLA), nylon, and the like.

Note that, even when the molds of the injection molding part 21 are opened, the neck mold 27 of the conveyance mechanism 26 is not opened, and the preform 10 is held and conveyed as it is. It is possible to appropriately set the number of the preforms 10 that can be simultaneously molded by the injection molding part 21 (that is, the number of containers that can be simultaneously molded by the blow molding apparatus 20).

(Temperature Adjustment Part 22)

The temperature adjustment part 22 performs temperature equalization and temperature unevenness removal of the preform 10 manufactured by the injection molding part 21, and adjusts the temperature of the preform 10 to a temperature suitable for blow molding (for example, about 90° C. to 105° C.) so as to have a temperature distribution suitable for a container shape to be shaped. Further, the temperature adjustment part 22 may also have a function of cooling the preform 10 in a high temperature state after injection molding.

Figure 2:
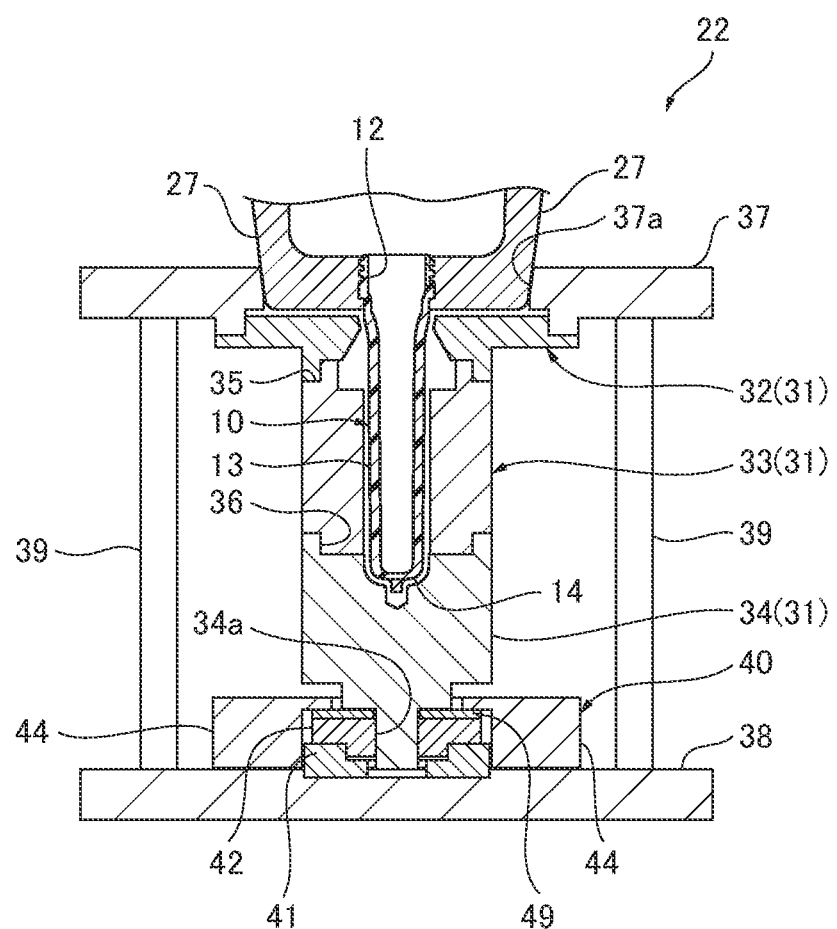
FIG. 2 is a view illustrating a configuration example of a temperature adjustment part.

FIG. 2 is a view illustrating a configuration example of the temperature adjustment part 22. The temperature adjustment part 22 includes a cavity mold (temperature adjusting pot) 31 capable of accommodating the preform 10. The cavity mold 31 has a temperature adjustment space having substantially the same shape as the outer shape of the preform 10 manufactured by the injection molding part 21. Note that the temperature adjustment part 22 may further include a mold member (temperature adjustment rod) to be inserted into the preform 10 although not particularly limited. Note that the temperature adjustment space of the cavity mold 31 accommodating the preform may have a horizontal cross-sectional shape being a perfect circle, an ellipse, or a polygon as necessary.

The cavity mold 31 of the first embodiment is configured in one or more stages in the axial direction of the preform 10. The cavity mold 31 is preferably divided into multiple stages in the axial direction of the preform 10, for example, divided into three, and includes an upper mold 32, a middle mold 33, and a lower mold 34. The upper mold 32 is a mold facing an outer surface in the vicinity of the neck portion 12 of the preform 10. The middle mold 33 is a mold facing an outer surface of a body portion 13 of the preform 10. The lower mold 34 is a mold facing an outer surface of the bottom portion 14 of the preform 10. A bottom surface of the upper mold 32 and an upper surface of the middle mold 33 are engaged by a first spigot joint 35, and a bottom surface of the middle mold 33 and an upper surface of the lower mold 34 are engaged by a second spigot joint 36. Further, a columnar shaft portion 34a protruding toward a bottom portion side along the vertical direction (the axial direction of the preform 10) is formed at the center of a bottom surface of the lower mold 34.

A heating member (not illustrated) such as a band heater is attached to each of the upper mold 32, the middle mold 33, and the lower mold 34 of the cavity mold 31. Therefore, the temperature of each of the upper mold 32, the middle mold 33, and the lower mold 34 is maintained at a predetermined temperature by the heating member. Further, a temperature distribution in the axial direction of the preform 10 can also be changed by changing the temperature of the heating member of each of the upper mold 32, the middle mold 33, and the lower mold 34. Note that the number of stages forming the cavity mold 31 may be appropriately changed from one stage to about ten stages according to a length of the body portion 13 of the preform 10.

The cavity mold 31 is sandwiched and fixed from both sides by an upper support plate 37 and a lower support plate 38.

The upper support plate 37 has an opening portion 37a having a shape corresponding to the neck mold 27, and is disposed on the upper surface side of the upper mold 32. Further, the upper support plate 37 is coupled to the lower support plate 38 by a plurality of fixing bolts (fixing members) 39 extending in the vertical direction. Note that, in a state where the neck mold 27 is lowered with respect to the cavity mold 31, the neck mold 27 is disposed in the opening portion 37a of the upper support plate 37, and the preform 10 held by the neck mold 27 is accommodated in the cavity mold 31.

The lower support plate 38 is fixed to a lower base (not illustrated) of the blow molding apparatus 20. A position adjustment mechanism 40 configured to adjust a position of the cavity mold 31 is provided on an upper surface of the lower support plate 38. Then, the lower support plate 38 holds the shaft portion 34a of the lower mold 34 via the position adjustment mechanism 40.

Next, the position adjustment mechanism 40 of the temperature adjustment part 22 will be described.

The position adjustment mechanism 40 has a function of adjusting a position where the cavity mold 31 is held in a one-dimensional direction (or the horizontal direction) on a plane of the lower support plate 38 orthogonal to the vertical direction. As illustrated in FIG. 2, the position adjustment mechanism 40 includes a fixed plate 41 fixed to the lower support plate 38, a movable plate 42, a spacer 49, and a pressing member 44. The fixed plate 41 is an example of a first member, and the movable plate 42 is an example of a second member.

Figure 4:
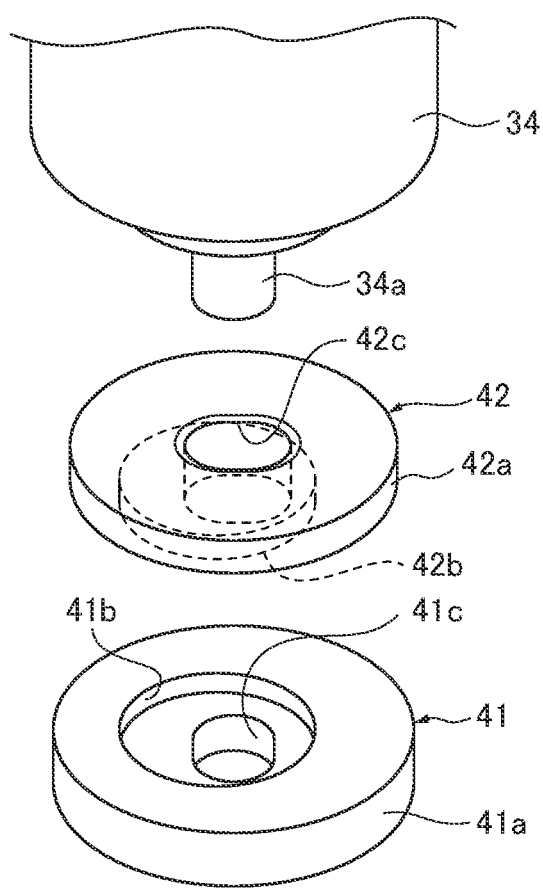
FIG. 4 is a perspective view illustrating a positional relationship among a fixed plate, a movable plate, and a lower mold.

The fixed plate 41, the movable plate 42, and the spacer 49 are all members formed in a disk shape as a whole, for example. In an assembled state of the position adjustment mechanism 40, the fixed plate 41, the movable plate 42, and the spacer 49 are stacked and disposed on the lower support plate 38 in order from the bottom. The shaft portion 34a of the lower mold 34 is inserted through the fixed plate 41, the movable plate 42, and the spacer 49. Note that FIG. 4 is a perspective view illustrating a positional relationship among the fixed plate 41, the movable plate 42, and the lower mold 34. The spacer 49 is not illustrated in FIG. 4 for simplicity.

Figure 3:
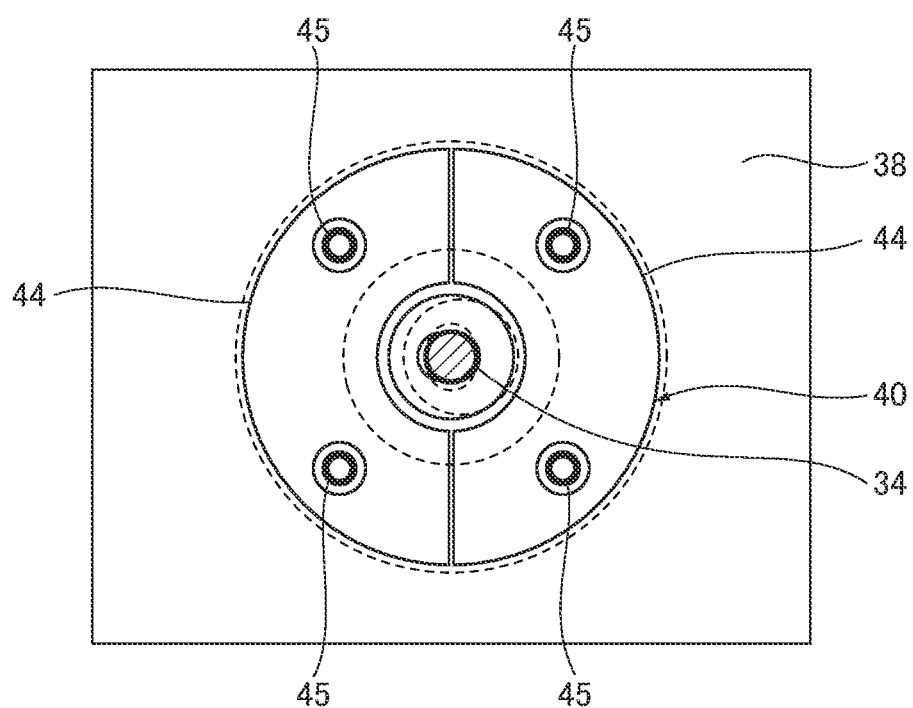
FIG. 3 is a plan view of a position adjustment mechanism.

As illustrated in FIG. 3, the pressing member 44 includes, for example, two half-ring shaped block members. The pressing member 44 has a space, on the inner side, in which the fixed plate 41, the movable plate 42, and the spacer 49 are disposed, and each of the block members is fixed to the lower support plate 38 using bolts (fixing members) 45. The pressing member 44 surrounds and holds the fixed plate 41, the movable plate 42, and the spacer 49 from the outer peripheral side. Further, the pressing member 44 has a function of holding a position of the movable plate 42 in a rotation direction with respect to the fixed plate 41 by pressing the movable plate 42 against the fixed plate 41 from above with the spacer 49 interposed therebetween. Note that the fixed plate 41 and the lower support plate 38 may be fixed via a positioning pin or the like (not illustrated) in order to suppress the positional deviation of the fixed plate 41.

Figures 5A, 5B:
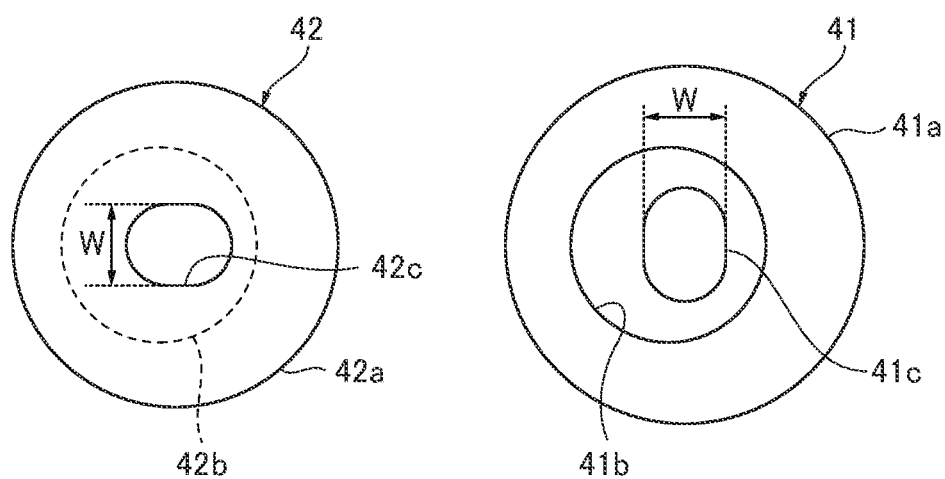
FIG. 5A is a plan view of the movable plate.
FIG. 5B is a plan view of the fixed plate.

FIG. 5A is a plan view of the movable plate 42. The movable plate 42 includes a disk-shaped movable plate body 42a and a columnar protrusion 42b formed on a bottom surface side of the movable plate body 42a. The protrusion 42b is formed at a position eccentric to the center of the movable plate body 42a. Further, an elongated hole (first elongated hole) 42c penetrating the movable plate body 42a and the protrusion 42b is formed in the movable plate 42. A width W of the elongated hole 42c in the short direction is set to a dimension which allows passage of the shaft portion 34a of the lower mold 34.

FIG. 5B is a plan view of the fixed plate 41. The fixed plate 41 includes a disk-shaped fixed plate body 41a and a bottomed cylindrical recess 41b formed on an upper surface side of the fixed plate body 41a. The recess 41b is formed at a position eccentric to the center of the fixed plate body 41a, and rotatably receives the protrusion 42b of the movable plate 42 disposed on the upper surface side. The recess 41b has a shape corresponding to the protrusion 42b, and is set to a size capable of pivotally supporting the protrusion 42b.

Further, a cam hole (second elongated hole) 41c for receiving the shaft portion 34a of the lower mold 34 is formed in a bottom surface of the recess 41b of the fixed plate 41. The cam hole 41c has a shape extending linearly in the longitudinal direction through the center of the fixed plate body 41a. A width W of the cam hole 41c in the short direction is set to a dimension which allows passage of the shaft portion 34a of the lower mold 34. Further, the cam hole 41c partially overlaps a position of the elongated hole 42c of the movable plate 42, but is formed such that the longitudinal direction of the cam hole 41c is a direction intersecting the elongated hole 42c.

Figure 6A:
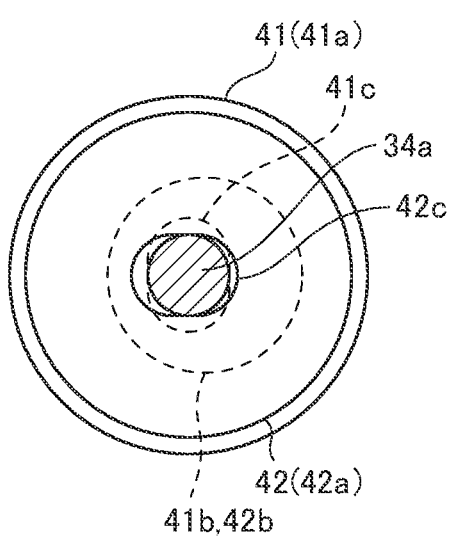
FIG. 6A is a plan view of a state in which the movable plate is superimposed on the fixed plate.
Figure 6B:
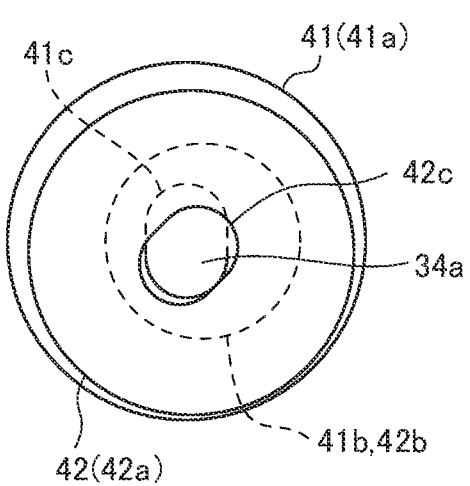
FIG. 6B is a view illustrating a state in which the movable plate is rotated from FIG. 6A.

FIG. 6A is a plan view of a state in which the movable plate 42 is superimposed on the fixed plate 41. FIG. 6B is a view illustrating a state in which the movable plate 42 is rotated from FIG. 6A.

In a state in which the movable plate 42 and the fixed plate 41 are vertically superposed, the protrusion 42b of the movable plate 42 is pivotally supported by the recess 41b of the fixed plate 41, and the movable plate 42 can be rotated using the protrusion 42b and the recess 41b as a rotation axis. Alternatively, the movable plate 42 may be rotated by fitting the protrusion 42b of the movable plate 42 into the recess 41b of the fixed plate 41 and rotating the protrusion 42b with respect to the recess 41b while causing an outer peripheral surface of the protrusion 42b to abut on an inner peripheral surface of the recess 41b, thereby rotating the movable plate 42.

Further, when the fixed plate 41 and the movable plate 42 are viewed from the vertical direction, the elongated hole 42c of the movable plate 42 is arranged to intersect the cam hole 41c of the fixed plate 41 as illustrated in FIGS. 6A and 6B. Therefore, when the shaft portion 34a of the lower mold 34 is inserted into the movable plate 42 and the fixed plate 41, the shaft portion 34a is restrained and positioned by an inner surface in the short direction of the cam hole 41c and an inner surface in the short direction of the elongated hole 42c intersecting the cam hole 41c. As a result, the cavity mold 31 can be positioned and held by the movable plate 42 and the fixed plate 41.

Further, when the movable plate 42 is rotated with respect to the fixed plate 41, a position where the cam hole 41c and the elongated hole 42c overlap each other moves along the longitudinal direction of the cam hole 41c as illustrated in FIGS. 6A and 6B. That is, a position where the shaft portion 34a is held in the longitudinal direction of the cam hole 41c can be adjusted by rotating the movable plate 42 with respect to the fixed plate 41. As a result, the movable plate 42 and the fixed plate 41 enable position adjustment (distance adjustment) of the cavity mold 31 facing the preform 10. That is, a position where the shaft portion 34a can be inserted moves by a predetermined distance toward the cam hole 41c in the longitudinal direction according to a rotation angle of the movable plate 42 with respect to the fixed plate 41, and a moving distance of the cavity mold 31 is determined (defined) with high accuracy. Furthermore, the fixed plate 41 can be fixed in a state of being rotated by a predetermined angle with respect to the lower support plate 38. Thus, a portion in the circumferential direction desired to be heated and the cavity mold 31 can be aligned with respect to the preform 10 that is supported by the neck mold 27 and is not capable of rotation.

(Blow Molding Part 23)

The blow molding part 23 performs stretch blow molding on the preform 10 whose temperature has been adjusted by the temperature adjustment part 22 to manufacture a container.

The blow molding part 23 includes a blow cavity mold which is a pair of split molds corresponding to a shape of the container, a bottom mold, a stretching rod, and an air introduction member (all of which are not illustrated). The blow molding part 23 blow-molds the preform 10 while stretching the preform 10. As a result, the preform 10 can be shaped into a shape of the blow cavity mold, whereby the container can be manufactured.

(Taking-Out Part 24)

The taking-out part 24 is configured to open the neck portion of the container manufactured by the blow molding part 23 from the neck mold 27 and take out the container to the outside of the blow molding apparatus 20.

<Description of Blow Molding Method>

Next, a blow molding method by the blow molding apparatus 20 of the first embodiment will be described.

Figure 7:
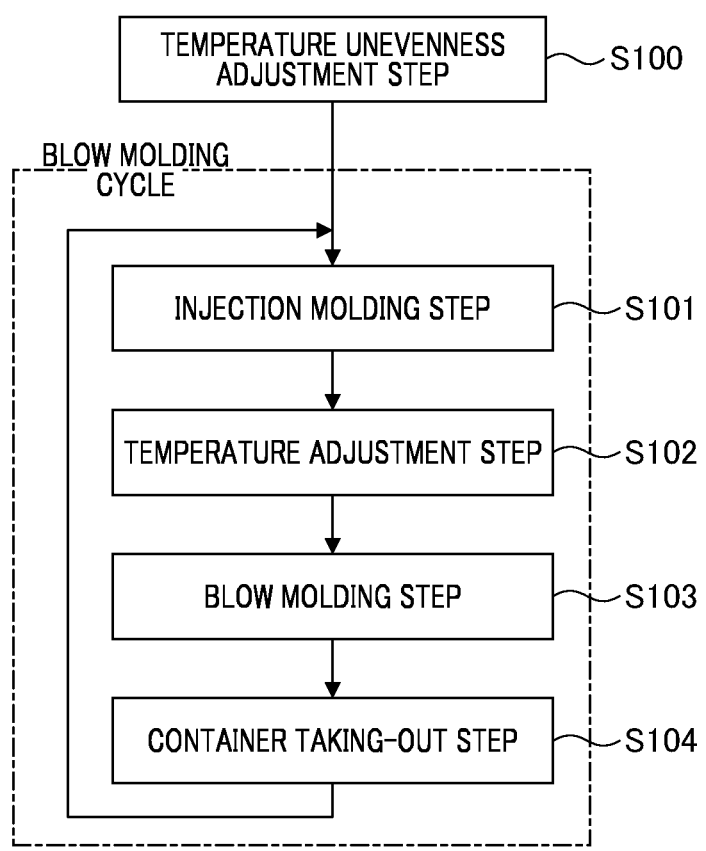
FIG. 7 is a flowchart illustrating steps of a blow molding method.

FIG. 7 is a flowchart illustrating steps of the blow molding method. In the first embodiment, a temperature unevenness adjustment step (S100) of adjusting a mold position of the temperature adjustment part 22 based on the result of a test operation is performed before each step (S101 to S104), which will be described later, of the blow molding method is performed.

(Step S100: Temperature Unevenness Adjustment Step)

The temperature unevenness adjustment step (a cavity mold position adjustment step for temperature adjustment) is a step of adjusting a position of the cavity mold 31 of the temperature adjustment part 22 according to a temperature distribution of the preform 10 injection-molded in the test operation or a thickness distribution of a container blow-molded in the test operation.

First, the blow molding apparatus 20 is subjected to the test operation to obtain information on the temperature distribution of the preform 10 before adjustment or information on the thickness distribution of the container. In a case where the temperature distribution of the preform 10 or the thickness distribution of the container are different from a desired state as a result of the above test operation, the position of the cavity mold 31 in the temperature adjustment part 22 is adjusted as follows. In the following description, as an example, it is assumed that adjustment is performed to reduce unevenness in the temperature distribution of the preform 10 or the thickness distribution of the container in the circumferential direction.

For example, when there is unevenness in the temperature distribution in the circumferential direction of the body portion 13 of the preform 10, a worker detaches the upper support plate 37, the cavity mold 31, and the pressing member 44. Alternatively, the pressing member 44 is detached, and the upper support plate 37, the cavity mold 31, the spacer 49, the movable plate 42, and the fixed plate 41 are loosened to such an extent as to enable the position adjustment. Then, the fixed plate 41 is rotated with respect to the lower support plate 38 such that a position in the circumferential direction where there is temperature unevenness or the like in the body portion 13 of the preform 10 is disposed on an extension line of a major axis (the longitudinal direction) of the cam hole 41c of the fixed plate 41.

Next, the worker rotates the movable plate 42 of the position adjustment mechanism 40 to adjust the position where the shaft portion 34a is held on the cam hole 41c of the fixed plate 41. At this time, the position where the shaft portion 34a is held may be adjusted by the position adjustment mechanism 40 such that an interval between a high-temperature portion of the preform 10 and the cavity mold 31 increases (the heating amount is decreased) or an interval between a low-temperature portion of the preform 10 and the cavity mold 31 decreases (the heating amount is increased). As a result, a portion having a higher temperature in the circumferential direction of the preform 10 is less likely to be heated by the cavity mold 31 during the test operation, and the unevenness of the temperature distribution in the circumferential direction of the preform 10 can be reduced. Further, when the fixed plate 41 is rotated with respect to the lower support plate 38 by the predetermined angle and fixed, the portion of the preform 10 in the circumferential direction desired to be heated and the cavity mold 31 can be reliably aligned. Note that the position adjustment (distance adjustment) work of the cavity mold 31 and the preform 10 may be performed by a method of detaching only the pressing member 44, rotating the movable plate 42 in a state where the shaft portion 34a of the cavity mold 31 is inserted into the elongated hole 42c of the movable plate 42 and the cam hole 41c of the fixed plate to adjust the interval between the cavity mold and the preform, and then, fixing the cavity mold 31 and the preform again with the pressing member 44.

Further, in a case where various adjustments in the temperature unevenness adjustment step are performed based on the thickness distribution of the container manufactured by the test operation, the adjustments may be performed as follows.

In blow molding of the one stage method, the high-temperature portion of the preform 10 has a larger residual heat, and the preform 10 is easily stretched. That is, a portion where the thickness of the container is thin corresponds to the high-temperature portion of the preform 10. On the other hand, the low-temperature portion of the preform 10 has a smaller residual heat than the higher-temperature portion of the preform 10, and the preform 10 is less likely to be stretched. That is, a portion where the thickness of the container is thick corresponds to the low-temperature portion of the preform 10.

Therefore, in the case of performing various adjustments in the temperature unevenness adjustment step based on the thickness distribution of the container, the adjustment may be performed in the same manner as described above by regarding the portion where the thickness of the container is thin as the high-temperature portion of the preform 10 and regarding the portion where the thickness of the container is thick as the low-temperature portion of the preform 10.

When the above temperature unevenness adjustment step is completed, each step of a blow molding cycle to be described below is executed.

(Step S101: Injection Molding Step)

In Step S101, in the injection molding part 21, a resin is injected from the injection device 25 into the mold space having the preform shape formed by the injection cavity mold, the injection core mold, and the neck mold 27 of the conveyance mechanism 26 to manufacture the preform 10.

In step S101, when the injection molding of the preform 10 is completed, the molds of injection molding part 21 are opened, and the preform 10 is released from the injection cavity mold and the injection core mold. Next, the transfer plate of the conveyance mechanism 26 moves so as to rotate by a predetermined angle, and the preform 10 held by the neck mold 27 is conveyed to the temperature adjustment part 22.

(Step S102: Temperature Adjustment Step)

Subsequently, temperature adjustment for bringing the temperature of the preform 10 close to a temperature suitable for final blow are performed in the temperature adjustment part 22.

As illustrated in FIG. 2, in the temperature adjustment step, the preform 10 is accommodated in the temperature adjustment space of the cavity mold 31. Note that the shape of the preform is maintained in a desired shape even in the temperature adjustment step since the cavity mold 31 corresponds to the shape of the preform 10.

In the temperature adjustment step, the preform 10 faces the cavity mold 31 so that the temperature of the preform 10 is adjusted so as not to be equal to or lower than a temperature suitable for blow molding, and further, the unevenness temperature generated at the time of injection molding is also reduced. In particular, the temperature unevenness of the preform 10 in the circumferential direction can be reduced since the position of the cavity mold 31 is appropriately adjusted by the position adjustment mechanism 40 in the temperature unevenness adjustment step (S100) in the first embodiment.

After the temperature adjustment step, the transfer plate of the conveyance mechanism 26 moves so as to rotate by a predetermined angle, and the preform 10 after the temperature adjustment held in the neck mold 27 is conveyed to the blow molding part 23.

(Step S103: Blow Molding Step)

Subsequently, blow molding of the container is performed in the blow molding part 23.

First, the blow cavity mold is closed to accommodate the preform 10 in the mold space, and the air introduction member (blow core) is lowered, so that the air introduction member abuts on the neck portion of the preform 10. Then, the stretching rod (vertical-axis stretching member) is lowered to hold the bottom portion of the preform 10 from an inner surface, and blow air is supplied from the air introduction member to stretch the preform 10 along the horizontal axis while performing vertical-axis stretching as necessary. As a result, the preform 10 is bulged and shaped so as to be in close contact with the mold space of the blow cavity mold, and is blow-molded into the container. Note that the bottom mold stands by at a lower position not in contact with the bottom portion of the preform 10 before closing the blow cavity mold, and quickly rises to a molding position before the mold closing or after the mold closing.

(Step S104: Container Taking-Out Step)

When the blow molding is finished, the blow cavity mold and the bottom mold are opened. As a result, the container is movable from the blow molding part 23.

Subsequently, the transfer plate of the conveyance mechanism 26 moves so as to rotate by a predetermined angle, and the container is conveyed to the taking-out part 24. In the taking-out part 24, the neck portion of the container is opened from the neck mold 27, and the container is taken out to the outside of the blow molding apparatus 20.

Thus, a series of steps of the blow molding cycle ends. Thereafter, the respective steps of S101 to S104 described above are repeated by moving the transfer plate of the conveyance mechanism 26 so as to rotate by a predetermined angle. During the operation of the blow molding apparatus 20, four sets of the container manufacturing process each having a time difference of one step are performed in parallel.

Hereinafter, operational effects of the first embodiment will be described.

The blow molding apparatus 20 of the first embodiment includes the position adjustment mechanism 40 that adjusts the position of the cavity mold 31 of the temperature adjustment part 22. The position adjustment mechanism 40 includes the fixed plate 41 in which the linear cam hole 41*c* that receives the shaft portion 34*a* of the cavity mold 31 is formed, and the movable plate 42 that is disposed to overlap the fixed plate 41 in an extending direction of the shaft portion 34*a* and rotates with respect to the fixed plate 41 along a plane. The movable plate 42 includes the elongated hole 42*c* that intersects the cam hole 41*c* in a planar direction and positions the shaft portion 34*a* together with the cam hole 41*c*. Then, a position where the cam hole 41*c* intersects the elongated hole 42*c* moves in the longitudinal direction of the cam hole 41*c* by the rotation of the movable plate 42.

As an example, in a case where a mold position is adjusted using a set screw or the like, it is necessary to individually adjust positions of the respective stages (for example, the upper mold 32, the middle mold 33, and the lower mold 34) forming the cavity mold 31 in the horizontal direction and then couple (fix) the stages, and the position adjustment work becomes complicated. On the other hand, in the position adjustment mechanism 40 of the first embodiment, a position where the shaft portion 34*a* of the cavity mold 31 is held moves along the cam hole 41*c* by rotating the movable plate 42 with respect to the fixed plate 41. Therefore, according to the first embodiment, appropriate position adjustment of the cavity mold 31 with respect to the preform 10 can be performed with good workability only by adjusting a position of the movable plate 42, and the temperature adjustment (heating degree) in the circumferential direction of the preform 10 can be accurately implemented. That is, the temperature adjustment in the circumferential direction of the preform 10 can be accurately performed only by relatively rotating the fixed plate 41 and the movable plate 42 in the horizontal direction. Further, according to the first embodiment, an adjusted position of the cavity mold 31 can be easily restored by a technique such as marking a position of the movable plate 42 with respect to the fixed plate 41, and the reproducibility of a temperature adjustment condition (heating condition) for the preform 10 can be secured.

In the position adjustment mechanism 40 of the first embodiment, projected areas of the position adjustment mechanism 40 and the cavity mold 31 in a plan view become extremely small since the fixed plate 41 and the movable plate 42 are disposed to overlap each other in the extending direction (extending direction) of the shaft portion 34*a*. Therefore, in the first embodiment, in a case where a plurality of or a plurality of rows of the cavity molds 31 are arranged in the blow molding apparatus 20, it is easy to dispose the cavity molds 31 with an interval therebetween reduced, it is possible to realize space saving of the cavity molds 31 at the time of simultaneously molding a large number of cavity molds, and it is easy to increase the number of containers that can be manufactured in one blow molding cycle.

Note that, for example, in a case where a mechanism such as a set screw is disposed on the side of a mold, it is difficult to dispose the molds with an interval therebetween reduced. Further, it is also possible to dispose a plurality of the set screws diagonally so as to narrow the interval between the molds, but the workability of position adjustment of the molds is greatly deteriorated in the case of the above configuration. The first embodiment is advantageous in that there is no problem as described above.

Second Embodiment

A second embodiment is a modification of the first embodiment, and has a configuration in which a positioning part for the fixed plate 41 and the movable plate 42 is provided. The positioning part of the second embodiment includes a plunger 46 that moves a locking piece 46*a* on the fixed plate 41 side and a receiving groove 43 as a receiving part that receives the locking piece on the movable plate 42 side. The second embodiment is different from the first embodiment in terms of configurations of the fixed plate 41 and the movable plate 42 of the position adjustment mechanism 40. Therefore, in the description of the second embodiment, the same reference signs will be given to configurations similar to those of the first embodiment, and redundant description will be omitted.

Figure 8A:
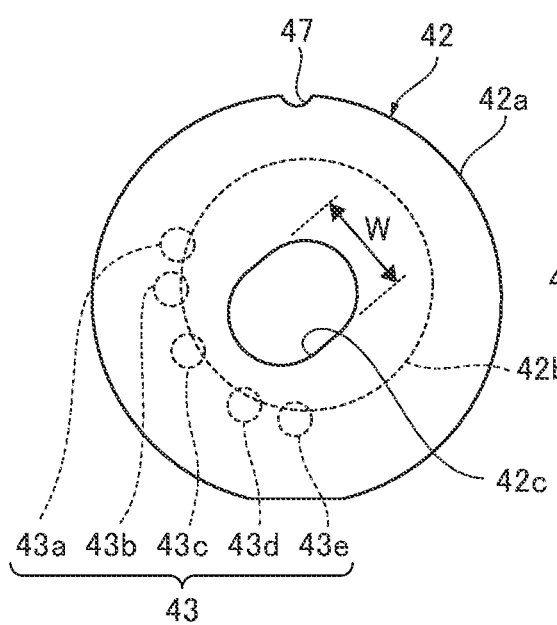
FIG. 8A is a plan view of a movable plate of a second embodiment.

FIG. 8A is a plan view of the movable plate 42 of the second embodiment. In the movable plate 42 of the second embodiment, at least two or more, for example, five recessed receiving grooves 43 as examples of the receiving part are formed on a lower surface (bottom surface) side of the movable plate body 42a and the columnar protrusion 42b. The receiving grooves 43a to 43e are disposed side by side along the outer periphery of the columnar protrusion 42b, and one of the receiving grooves 43a to 43e receives the locking piece 46a on the fixed plate 41 side to be described later. Further, a notch (first indicator) 47 used as a mark for alignment with the fixed plate 41 is formed on the outer periphery of the movable plate body 42a. Note that configurations and functions of the protrusion 42b and the elongated hole 42c are similar to those of the first embodiment. A shape of the notch (first indicator) 47 is preferably a notch shape as illustrated in FIG. 8A, but may be a protrusion shape protruding from the outer periphery of the movable plate body 42a.

Figure 8B:
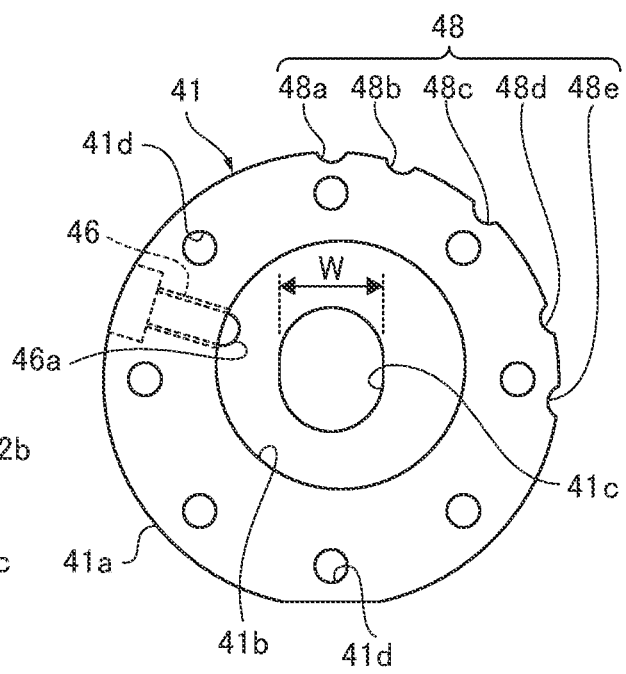
FIG. 8B is a plan view of a fixed plate of the second embodiment.

FIG. 8B is a plan view of the fixed plate 41 of the second embodiment. In the fixed plate 41 of the second embodiment, one plunger (locking member) 46 is embedded in an inner peripheral surface of the recess 41b. The plunger 46 has, for example, the locking piece 46a having a ball shape and biased to the inner side of the recess 41b by a spring (not illustrated). Note that the locking piece 46a may have a pin shape.

In a state in which the movable plate 42 and the fixed plate 41 are vertically superposed, the protrusion 42b of the movable plate 42 is pivotally supported by the recess 41b of the fixed plate 41, and the movable plate 42 can be rotated using the protrusion 42b and the recess 41b as a rotation axis. Alternatively, the movable plate 42 may be rotated by fitting the protrusion 42b of the movable plate 42 into the recess 41b of the fixed plate 41 and rotating and the protrusion 42b with respect to the recess 41b while causing an outer peripheral surface of the protrusion 42b to abut on an inner peripheral surface of the recess 41b, thereby rotating the movable plate 42.

Here, when positions of the plunger 46 and any one of the receiving grooves 43a to 43e overlap each other in the circumferential direction, the locking piece 46a biased to the inner side of the recess 41b is locked to the receiving groove of the protrusion 42b, and the movable plate 42 is positioned with respect to the fixed plate 41. As a result, the movable plate 42 is positioned with respect to the fixed plate 41 at five positions where the receiving grooves 43a to 43e overlap the plunger 46. Note that when a predetermined or greater force in the rotation direction is applied to the movable plate 42, the spring of the plunger 46 is compressed by elastic deformation, and the locking piece 46a is retracted outward, whereby the locking of the locking piece 46a and any of the receiving grooves 43a to 43e is easily released.

Further, at least two or more, for example, five notches (second indicators) 48 (48a to 48e) used for alignment with the notch (first indicator) 47 of the movable plate 42 are formed on the outer periphery of the fixed plate 41. The notch 48a is formed at a position overlapping the notch 47 when the locking piece 46a is locked to the receiving groove 43a. The notch 48b is formed at a position overlapping the notch 47 when the locking piece 46a is locked to the receiving groove 43b. The notch 48c is formed at a position overlapping the notch 47 when the locking piece 46a is locked to the receiving groove 43c. The notch 48d is formed at a position overlapping the notch 47 when the locking piece 46a is locked to the receiving groove 43d. The notch 48e is formed at a position overlapping the notch 47 when the locking piece 46a is locked to the receiving groove 43e. Note that the shape of the notch (second indicator) 48 is preferably a notch shape as illustrated in FIG. 8B, but may be a protrusion shape protruding from the outer periphery of the fixed plate 41.

Further, the fixed plate 41 has a plurality of pin holes 41d opened at regular intervals in the circumferential direction. The pin hole 41d of the fixed plate 41 receives a positioning pin (not illustrated) that penetrates the lower support plate 38 and is inserted from below. In this manner, the fixed plate 41 disposed on the lower support plate 38 is positioned on the lower support plate 38 by the positioning pin. As a result, it is possible to accurately dispose a position in the circumferential direction of the body portion 13 where there is temperature unevenness of the preform 10 or the like on an extension line of the major axis (longitudinal direction) of the cam hole 41c of the fixed plate 41 without positional deviation. Then, a temperature state of the body portion 13 can be appropriately adjusted before blow molding by a shift of the cavity mold 31 to be described later.

FIGS. 9A to 9E are views illustrating a rotation state of the movable plate 42 and the fixed plate 41 in the second embodiment, and illustrate changes when the movable plate 42 is rotated in the clockwise direction from FIG. 9A to FIG. 9E. In a case where the movable plate 42 is to be rotated, the cavity mold 31 is first detached, and then the pressing member 44 and the spacer 49 of the position adjustment mechanism 40 are detached to perform adjustment. Alternatively, the pressing member 44 may be detached, and the upper support plate 37, the cavity mold 31, the spacer 49, the movable plate 42, and the fixed plate 41 may be loosened to such an extent as to enable the positions adjustment.

In FIG. 9A, the locking piece 46a is locked to the receiving groove 43a, and the notch 47 is at the position overlapping the notch 48a. Further, the elongated hole 42c of the movable plate 42 is disposed to intersect the cam hole 41c of the fixed plate 41. Therefore, when the shaft portion 34a of the lower mold 34 is inserted into the movable plate 42 and the fixed plate 41 in the state of FIG. 9A, the shaft portion 34a is restrained and positioned by an inner surface in the short direction of the cam hole 41c and an inner surface in the short direction of the elongated hole 42c intersecting the cam hole 41c.

When the movable plate 42 is rotated clockwise from FIG. 9A, the state of FIG. 9B is obtained. In FIG. 9B, the locking piece 46a is locked to the receiving groove 43b, and the notch 47 is at the position overlapping the notch 48b. Further, in FIG. 9B, a position where the shaft portion 34a is held is shifted to the upper side in the drawing as compared with FIG. 9A.

When the movable plate 42 is rotated clockwise from FIG. 9B, the state of FIG. 9C is obtained. In FIG. 9C, the locking piece 46a is locked to the receiving groove 43c, and the notch 47 is at the position overlapping the notch 48c. Further, in FIG. 9C, the position where the shaft portion 34a is held is shifted to the upper side in the drawing as compared with FIG. 9B.

When the movable plate 42 is rotated clockwise from FIG. 9C, the state of FIG. 9D is obtained. In FIG. 9D, the locking piece 46a is locked to the receiving groove 43d, and the notch 47 is at the position overlapping the notch 48d.

Further, in FIG. 9D, the position where the shaft portion 34a is held is shifted to the upper side in the drawing as compared with FIG. 9C.

When the movable plate 42 is rotated clockwise from FIG. 9D, the state of FIG. 9E is obtained. In FIG. 9E, the locking piece 46a is locked to the receiving groove 43e, and the notch 47 is at the position overlapping the notch 48e. Further, in FIG. 9E, the position where the shaft portion 34a is held is shifted to the upper side in the drawing as compared with FIG. 9D.

Note that each time a locking position between the locking piece 46a and the receiving groove 43 is moved one by one, that is, each time an overlapping position between the notch (first indicator) 47 and the notch (second indicator) 48 is moved one by one, the shaft portion 34a or the cavity mold 31 moves with respect to (closer to or farther from) the body portion 13 of the preform 10 by a certain distance (for example, 0.3 mm or 0.5 mm).

Further, FIGS. 10A to 10E are cross-sectional views illustrating a positional relationship between the middle mold 33 and the preform 10. FIGS. 10A to 10E correspond to the position adjustment of the shaft portion 34a according to FIGS. 9A to 9E, respectively.

Figure 10A:
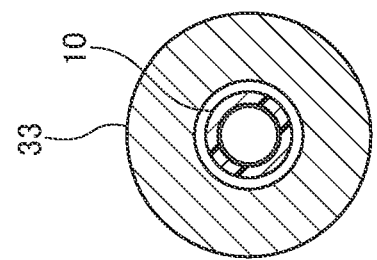
FIGS. 10A to 10E are cross-sectional views illustrating a positional relationship between a middle mold and a preform, which corresponds to FIGS. 9A to 9E.

In FIG. 10A corresponding to FIG. 9A, the preform 10 is concentrically disposed at the center of the middle mold 33. On the other hand, a position of the cavity mold 31 (middle mold 33) is also shifted to the upper side in the drawing in FIGS. 10B to 10E as the position where the shaft portion 34a is held is shifted to the upper side in the drawing as illustrated in FIGS. 9B to 9E. Meanwhile, since the position of the preform 10 is constant, the preform 10 is disposed eccentrically with respect to the cavity mold 31 (middle mold 33) along with the shift of the cavity mold 31 accompanying the position adjustment of the shaft portion 34a.

Figure 10B:
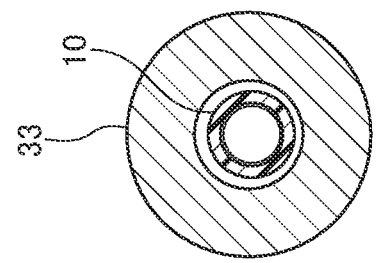
Figure 10C:
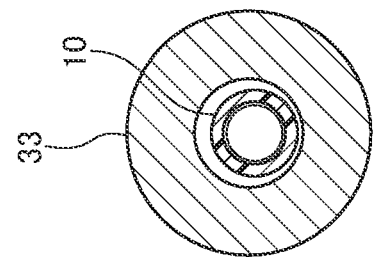
Figure 10D:
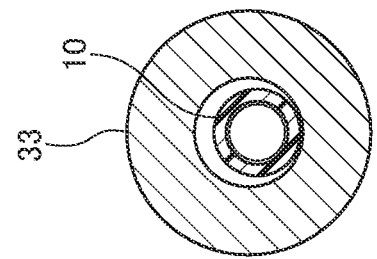
Figure 10E:
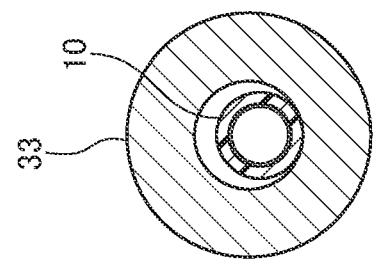

Note that the amount of eccentricity of the cavity mold 31 with respect to the preform 10 is the largest in FIG. 10E, and decreases in the order of FIG. 10D, FIG. 10C, and FIG. 10B, and the amount of eccentricity becomes zero in FIG. 10A.

As described above, according to the second embodiment, the plunger 46 is locked to one of the receiving grooves 43a and to 43e, whereby the movable plate 42 that rotates is positioned at a predetermined position with respect to the fixed plate 41. As a result, it is possible to accurately adjust the amount of eccentricity (that is, the degree of heating of the preform 10 in the circumferential direction) of the cavity mold 31 with respect to the preform 10 by a simple operation in the temperature unevenness adjustment step, and it is possible to improve the reproducibility when the amount of eccentricity is adjusted. Further, a worker can confirm the amount of eccentricity of the position adjustment mechanism 40 also by aligning the notch 47 and any of the notches 48a to 48e in the second embodiment, and thus, the workability in the temperature unevenness adjustment step is also improved.

The present invention is not limited to the above-described embodiments, and various improvements and design modifications may be made within the scope not departing from the gist of the present invention.

The configuration of the cavity mold 31 of the above embodiments is an example, and is not limited to the above embodiments. Further, the blow molding apparatus 20 of the above embodiments may be configured to include, for example, a plurality of injection molding parts (a so-called five station type configuration). At this time, a configuration in which a temperature adjustment part is further disposed between the injection molding parts (a so-called six station type configuration) may be adopted.

Further, the configurations of the fixed plate 41 and the movable plate 42 of the above embodiments are merely examples, and for example, a protrusion may be formed on the fixed plate 41 side and a recess may be formed on the movable plate 42 side. Furthermore, the movable plate 42 and the fixed plate 41 may have a polygonal outer shape instead of a disk shape as long as the protrusion and the recess are rotatable in a complementary manner. Similarly, the pressing member 44 only needs to have an outer diameter that allows the movable plate 42 and the fixed plate 41 to be held, and may be a polygonal halved member having a hollow region on the lower side.

Further, not only the temperature unevenness of the body portion of the preform may be eliminated, but also a part of the body portion of the preform in the circumferential direction may be locally heated and used for molding a flat container or the like.

Further, the embodiments disclosed herein are to be considered as illustrative and not restrictive in all respects. The scope of the present invention is indicated not by the above description but by the claims, and it is intended that meanings equivalent to the claims and all modifications within the scope are included.

The invention claimed is:

1. A mold comprising a position adjustment mechanism that receives a shaft portion extending from a cavity mold, which accommodates a preform, and adjusts a position where the cavity mold is held on a plane intersecting an extending direction of the shaft portion,
   wherein the position adjustment mechanism includes:
   a first member in which a linear cam hole that receives the shaft portion is formed; and
   a second member disposed to overlap the first member in the extending direction of the shaft portion and rotates with respect to the first member along the plane,
   the second member includes an elongated hole that intersects the cam hole in a direction of the plane and positions the shaft portion together with the cam hole, and
   a position where the cam hole and the elongated hole intersect each other is moved along a longitudinal direction of the cam hole by rotation of the second member.

2. The mold according to claim 1, wherein
   the second member rotates about a position shifted from a center of the cam hole as a rotation axis.

3. The mold according to claim 2, wherein
   one member of the first member and the second member has a columnar protrusion eccentric from a center of the one member in the direction of the plane,
   another member of the first member and the second member has a bottomed cylindrical recess that receives the protrusion rotatably, and
   the second member rotates about the protrusion and the recess as the rotation axis.

4. The mold according to claim 3, wherein
   the one member of the first member and the second member has an elastically deformable locking piece on an outer periphery of the protrusion,
   the another member of the first member and the second member has receiving portions each of which receives the locking piece on an inner periphery of the recess at a plurality of positions in a circumferential direction, and
   a rotation position of the second member with respect to the first member is positioned as the locking piece is locked to the receiving portion.

5. The mold according to claim 1, wherein
the cavity mold is a temperature adjustment mold that adjusts a temperature of the preform having residual heat from injection molding, and
a distance of the temperature adjustment mold from the preform is adjusted by adjusting a position of the shaft portion.

6. A blow molding apparatus comprising:
an injection molding part configured to perform injection molding of a preform made of a resin;
a temperature adjustment part configured to adjust a temperature of the preform having residual heat from the injection molding; and
a blow molding part configured to blow-mold the preform in a state after the temperature adjustment to manufacture a resin container,
wherein the temperature adjusting part includes the mold according to claim 5.

* * * * *